THEODORE VOORHEES
INVENTOR

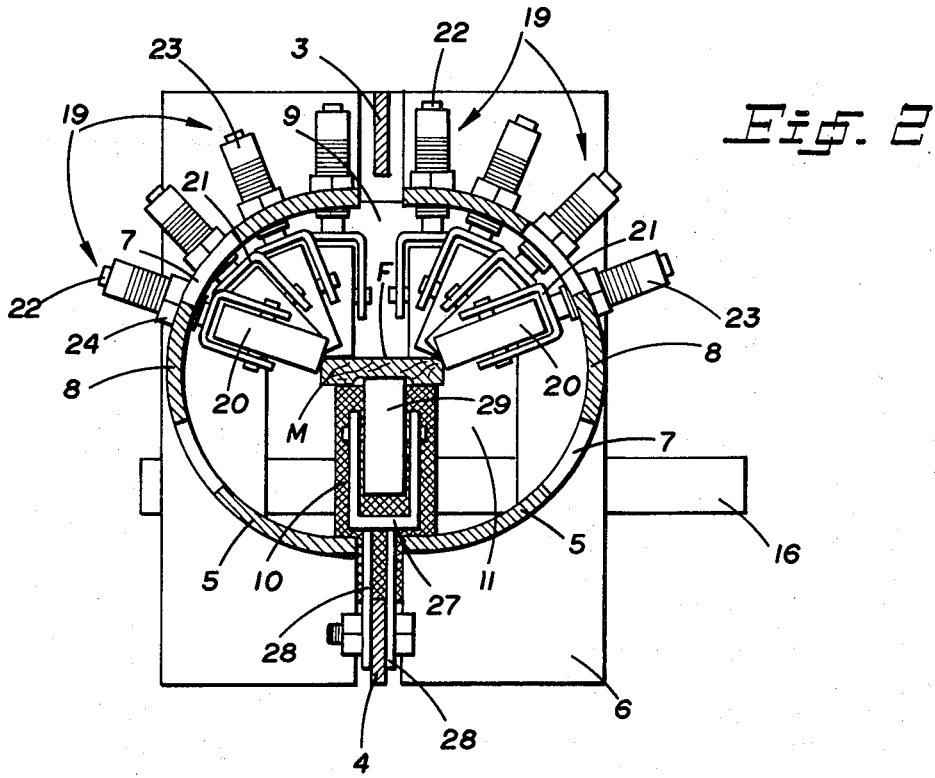
Fig. 2
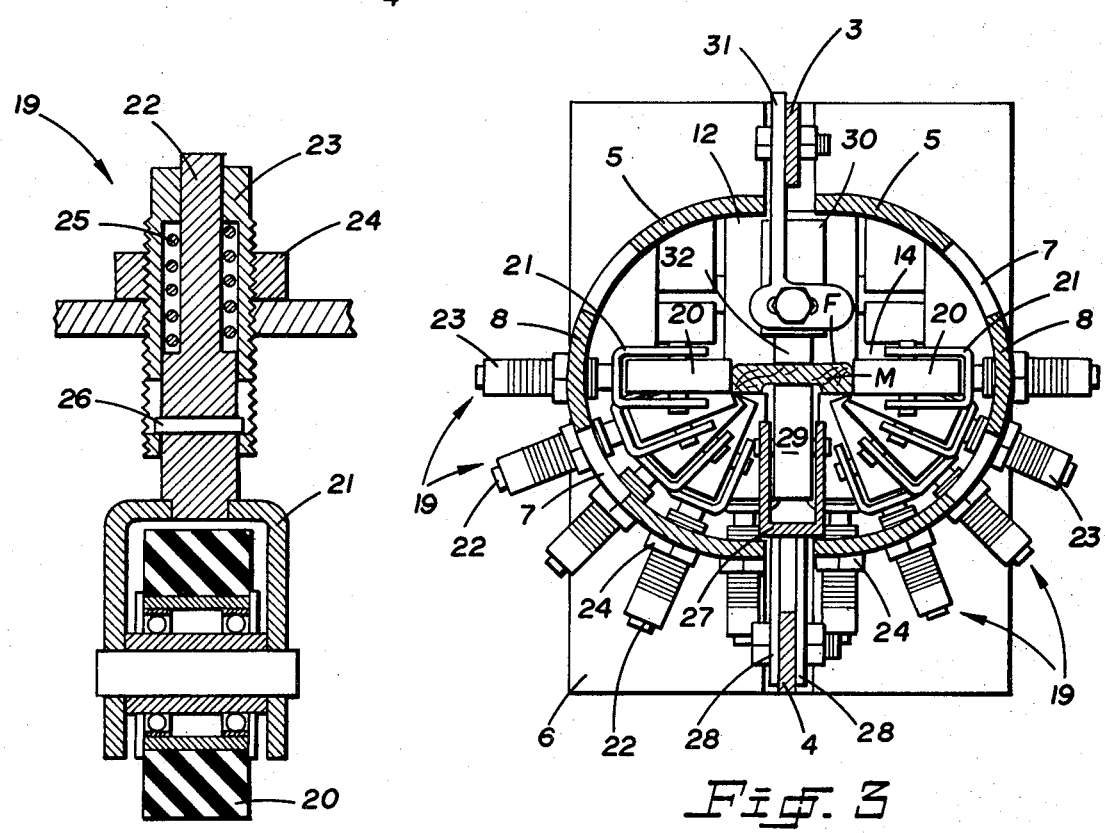
Fig. 4
Fig. 3

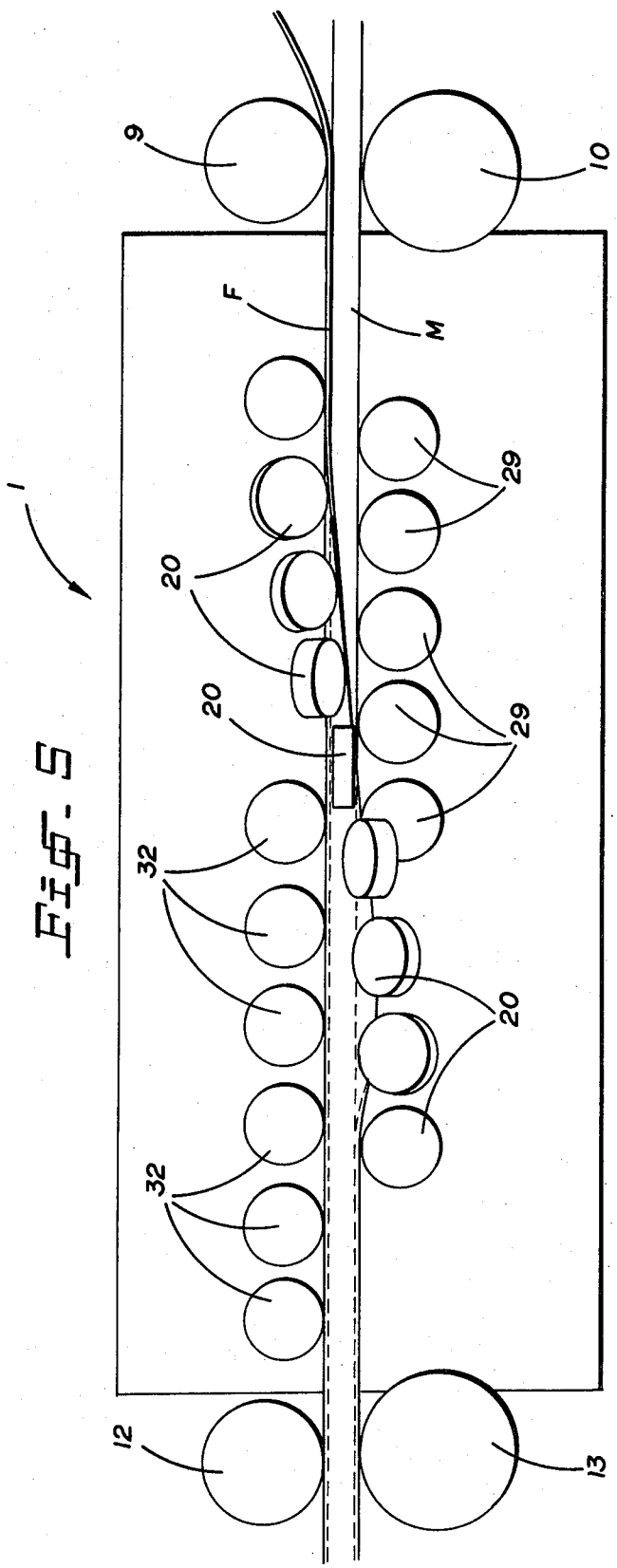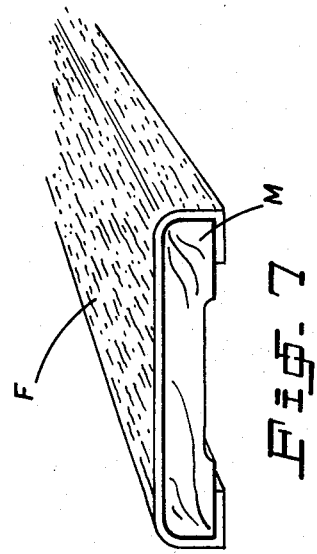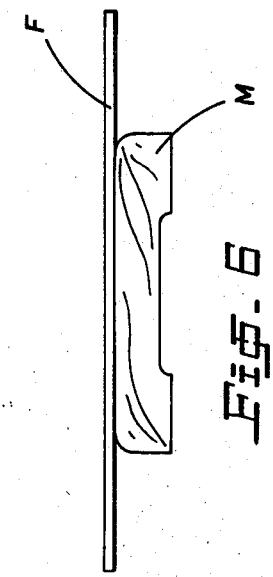

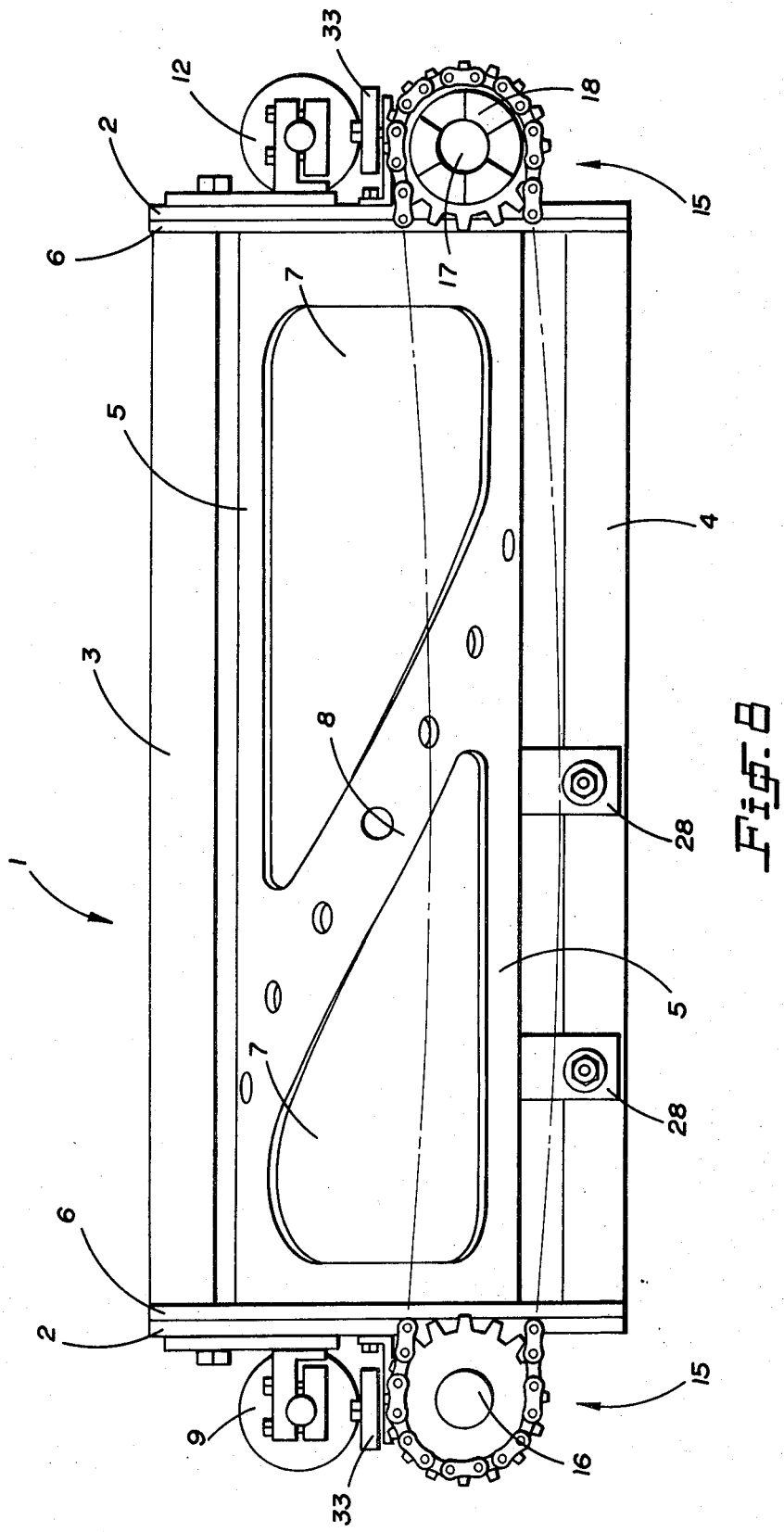

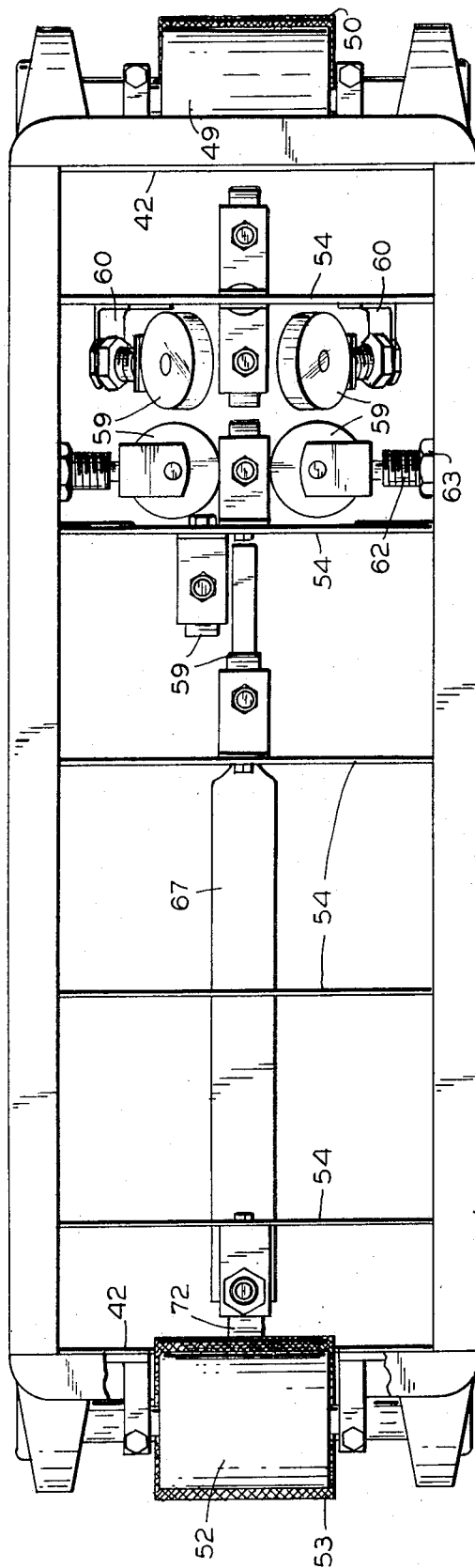
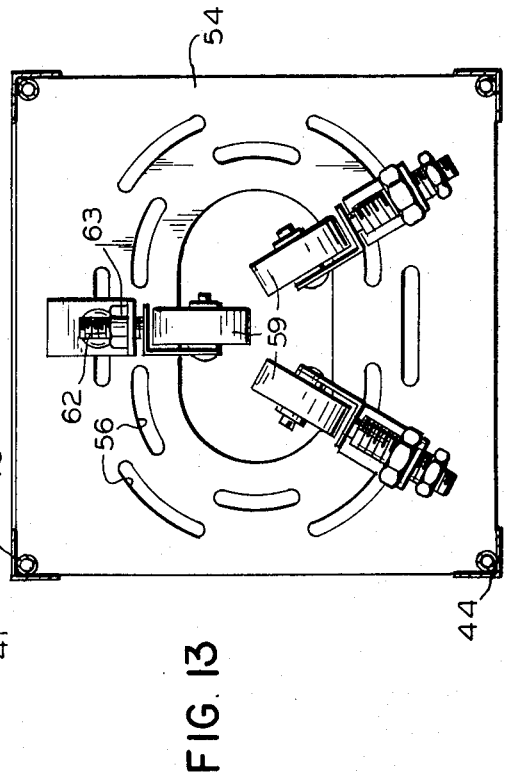

BY
BUCKHORN, BLORE, KLARQUIST & SPARKMAN
ATTORNEYS

United States Patent Office 3,698,989
Patented Oct. 17, 1972

3,698,989
MACHINE FOR LAMINATING SURFACE
TEXTURED FILM ON STRIP MOLDING
Theodore Voorhees, 331 Greenacres Drive,
Anderson, Calif. 96007
Continuation-in-part of application Ser. No. 865,019,
Oct. 9, 1969. This application Sept. 4, 1970, Ser.
No. 69,552
Int. Cl. B32b 31/04
U.S. Cl. 156—479
2 Claims

ABSTRACT OF THE DISCLOSURE

A machine for laminating film, preferably of vinyl and surface-textured to represent an expensive wood such as walnut or mahogany, on strip molding of inexpensive wood; the machine being comprised of a frame provided with means to advance a strip of molding in a predetermined lineal path through such frame, such molding and a run of the film being simultaneously fed to the machine in fact-to-face relation; the film having pre-applied adhesive on the face thereof adjacent the molding, and a frame-mounted pressure roller assembly cooperating with advancing strip molding and film smoothly to bond the film to said molding.

CROSS-REFERENCE TO RELATED APPLICATION

This application is a continuation-in-part of my copending application Ser. No. 865,019, filed Oct. 9, 1969, now abandoned.

BACKGROUND OF THE INVENTION

In the building material industry, wall panels and strip molding are being manufactured from inexpensive wood having a film of vinyl or the like laminated thereon; the film being surface-textured so that the finished product appears to be made of an expensive wood such as walnut or mahogany. In applying the film, particularly to strip molding, problems have been met in attaining an effective and smooth bond of the film on the molding. The present machine was conceived in the corse of efforts seeking a solution to such problems.

SUMMARY OF THE INVENTION

The present invention provides, as a major object, a novel machine for laminating film, preferably of vinyl and surface-textured to represent an expensive wood such as walnut or mahogany, on strip molding of inexpensive wood; the machine being operative smoothly to laminate a run of the film on a strip of molding and with an effective bond therebetween.

The present invention provides, as another object, a machine, as in the preceding paragraph, which comprises a frame provided with means to advance a strip of molding in a predetermined lineal path through such frame, such molding and a run of the film being simultaneously fed to the machine in fact-to-face relation; the film having pre-applied adhesive on the face thereof adjacent the molding, and a frame-mounted pressure roller assembly cooperating with the advancing strip molding and film to accomplish the aforesaid smooth lamination and effective bonding of the film on the molding.

The present invention provides, as a further object, a machine for laminating surface-textured film on strip molding which is designed for ease and economy of manufacture.

The present invention provides, as a still further object, a practical, reliable, and durable machine for laminating surface-textured film on strip molding and one which is exceedingly effective for the purpose for which it is designed.

BRIEF DESCRIPTION OF THE DRAWINGS

FIG. 2 is a transverse sectional elevation on line 2—2 of FIG. 1.
FIG. 3 is a transverse sectional elevation on line 3—3 of FIG. 1.
FIG. 4 is an enlarged sectional elevation of one of the spring-pressed roller units.
FIG. 5 is a diagrammatic side elevation showing particularly the progressive application of the film to the molding by the roller assembly.
FIG. 6 is a view showing the relationship of the film and molding in the machine at the in-feeding end thereof.
FIG. 7 is a fragmentary perspective view of the finished product.
FIG. 8 is a side elevation, with the frame in outline and with the roller assembly omitted, showing—from the side opposite FIG. 1—the endless drive mechanism for the in-feed and out-feed rolls.
FIG. 9 is a plan view of another embodiment of the present invention.
FIG. 13 is a transverse sectional elevation on line 13—13 of FIG. 10.

DESCRIPTION OF THE PREFERRED EMBODIMENTS

Figure 1:
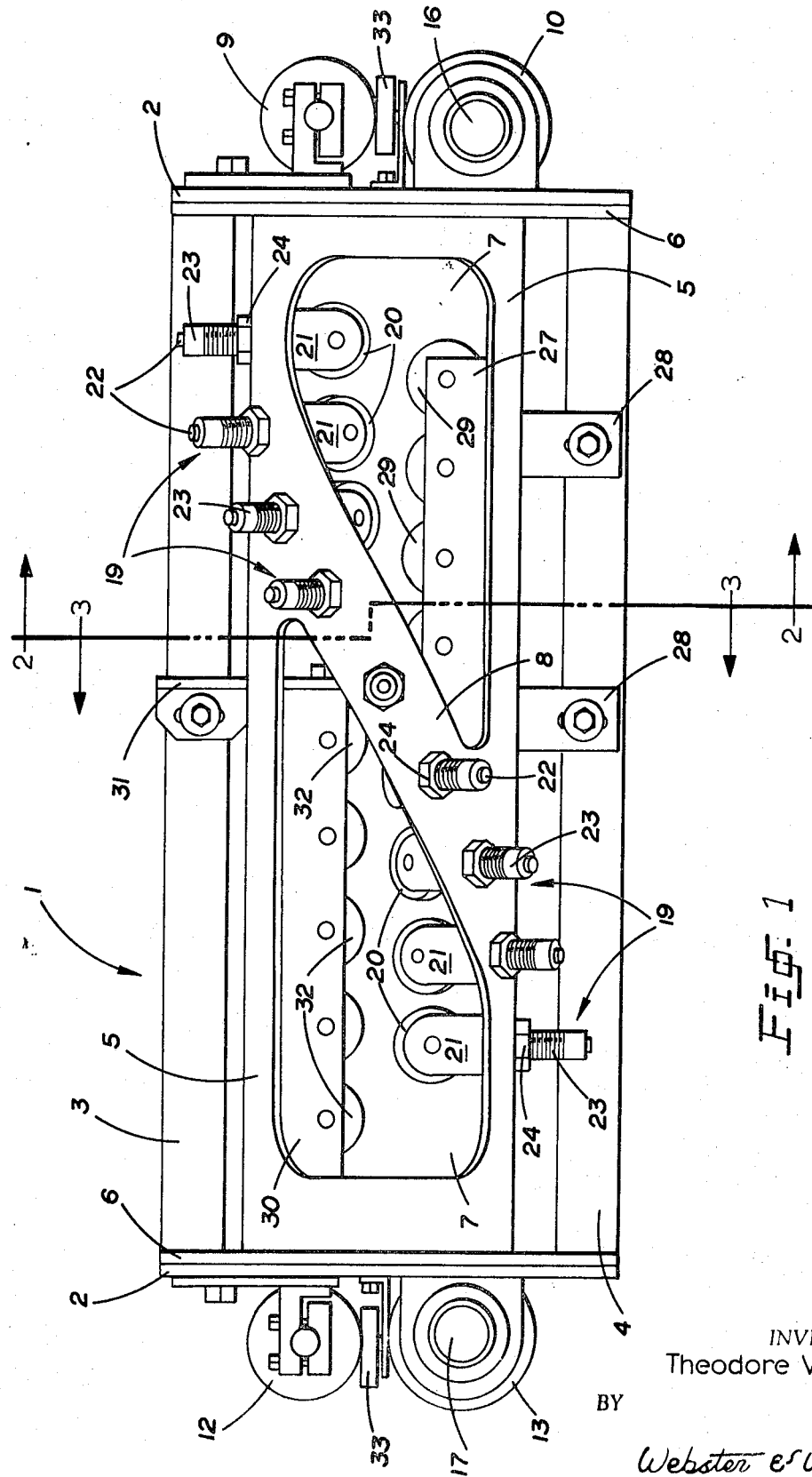
FIG. 1 is a side elevation of the machine.

Referring now more particularly to FIGS. 1–8 and to the characters of reference marked thereon, the machine comprises a relatively open, elongated main frame indicated generally at 1; such frame including end plates 2 connected in rigid relation by a central, longitudinal top bar 3 and a central, longitudinal bottom bar 4.

A laterally inwardly facing, concave channel member 5, of substantially half-cylindrical form in cross section, is disposed on each side of the central longitudinal vertical plane of the machine, i.e. on opposite sides relative to the vertical plane occupied by top bar 3 and bottom bar 4; the two channel members 5 extending from end to end of the frame 1 and at their ends having attachment plates 6 secured to the adjacent end plates 2. The channel members 5 each have areas 7 cut out for weight reduction and access to the interior of the machine, but which cut-outs leave a portion herein termed a carrier bar 8; such carrier bar 8 having the form of an elongated part-helix approaching 180 degrees in extent, and disposed so as to sweep forwardly and downwardly from a high end adjacent the in-feed end of the machine to a low end adjacent the out-feed end thereof. The purpose of such part-helix carrier bars 8, and which are opposed relative to and substantially coaxial with the central longitudinal axis of the machine, will hereinafter appear.

A pair of vertically spaced, transverse axis rolls (indicated at 9 and 10) is disposed at the in-feed end of the frame 1, and such rolls 9 and 10 are journaled in connection with the adjacent end plate 2; the latter having an opening 11 in the working zone of such rolls to permit the passage of material from the same into the machine. The upper roll 9 is of cushion-type and an idler, while the lower roll 10 is hard-faced (preferably surface-knurled) and driven in a direction to feed into the machine material engaged between such rolls. A similar pair of rolls (indicated at 12 and 13) is disposed at the out-feeding end of the frame 1, and such rolls 12 and 13 are journaled in connection with the adjacent end plate 2; the latter also having an opening 14 to permit the passage of material out of the machine. Here, too, the upper roll 12 is of cushion-type and an idler, while the lower roll 13 is hard-faced and driven in a direction to feed out of the machine material engaged between such rolls.

The bottom rolls 10 and 13 are simultaneously driven at the same speed and in the same direction, to feed material through the machine, by means of a longitudinally extending, endless chain and sprocket unit 15 disposed along one side of the frame 1 and connected between the shafts 16 and 17 of said bottom rolls 10 and 13, respectively. The sprocket at one end of the shaft 17 is formed with a coupling-part 18 adapted to engage with a drive mechanism (not shown) which includes the mating coupling-part.

Each of the part-helix carrier bars 8 is fitted with a row of closely spaced, spring-pressed roller units indicated generally at 19; each such roller unit 19 projecting inwardly from the related carrier bar 8, and including a roller 20 on its inner end. With the roller units 19 thus mounted, the rollers 20 thereof are disposed in a row following an elongated helical curve extending from a point above to a point below the central longitudinal axis of the machine.

By reference particularly to FIG. 4, each roller unit 19 is comprised of a yoke 21 in which the roller 20 is journaled, and a stem 22 projects from the yoke into a sleeve 23 in slidable relation; the sleeve being threaded through the carrier bar 8 and held in place by a lock nut 24. A compression spring 25 in the sleeve engages and yieldably urges the stem—and consequently the roller 20—in an inward direction. A cross pin 26 on the stem limits the extent to which the latter can be moved by spring 25.

As will be later more fully described, strip molding M travels through the machine—along the central longitudinal axis thereof—between the in-feed rolls 9–10 and the out-feed rolls 12–13, and in the course of such travel the molding is stabilized against vertical deflection in the following manner:

Extending from adjacent the in-feeding end of the machine to slightly beyond its mid-point, is a lower, longitudinal support bar 27 disposed below the path of travel of the molding M; such support bar 27 being maintained in a rigid position by depending ears 28 secured to the bottom bar 4. The lower support bar 27 carries a row of rollers 29 adapted to engage the underside and prevent downward deflection of the adjacent part of the molding as traveling through the machine.

Extending from adjacent the mid-point of the machine to the out-feeding end thereof, is an upper, longitudinal support bar 30 disposed above the path of travel of the molding M; such upper support bar 30 being maintained in a rigid position by suspension at its rear end—as at 31—from the top bar 3, and suitable connection at its forward end to the corresponding end plate 2. The upper support bar 30 carries a row of rollers 32 adapted to engage the top-side and prevent upward deflection of the adjacent part of the molding traveling through the machine.

FIGS. 9–13 illustrate a different embodiment of the invention. As such the machine is seen to comprise a relatively open elongated main frame 41 including end plates 42 connected in rigid relation by top and bottom angle members 43 and 44, respectively.

A pair of vertically spaced transverse axis rolls 49 and 50 are disposed at the in-feed end of the frame 41. Rolls 49 and 50 are of the type and are journaled in the manner disclosed in connection with the first described embodiment set forth hereinabove. A similar pair of rolls 52 and 53 are disposed at the out-feeding end of the frame 41 and are of the type and are journaled as described in said above described embodiment.

The bottom rolls 50 and 53 are simultaneously driven at the same speed and in the same direction to feed material through the machine.

A plurality of supporting plates 54 are mounted along the length of frame 41, being retained by the angle members 43 and 44 as shown. Each of such supporting plates 54 is provided with a plurality of symmetrically disposed slots 56 by which roller units 59, similar to the roller units 19 hereinabove described, may be adjustably attached.

Figure 12:
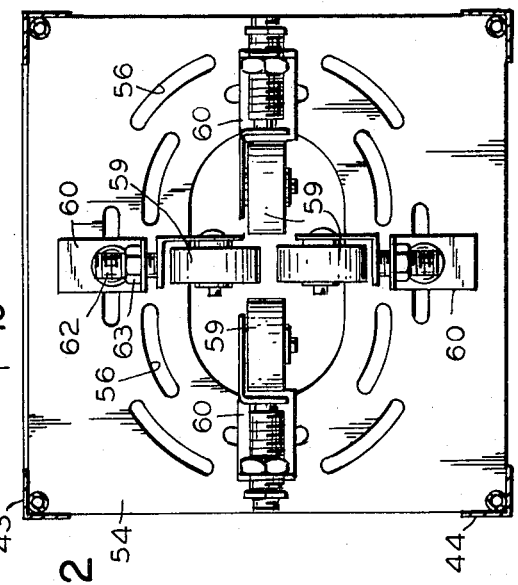
FIG. 12 is a transverse sectional elevation on line 12—12 of FIG. 10.
Figure 11:
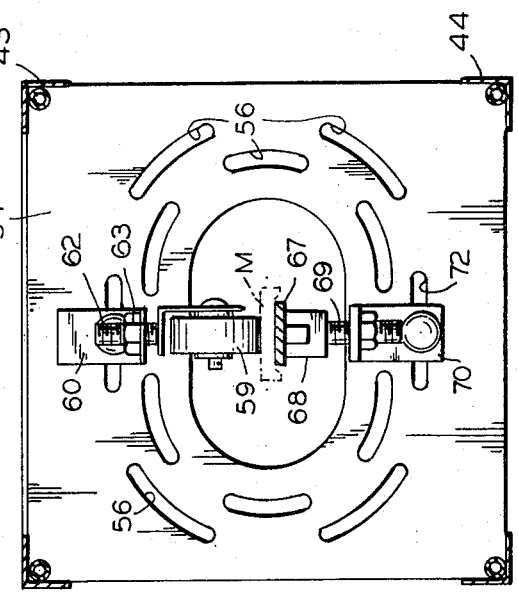
FIG. 11 is a transverse sectional elevation on line 11 of FIG. 10.

As shown in FIGS. 11–13, which are typical of roller arrangements possible with a machine constructed in accordance with the embodiment, each roller unit 59 is threadedly supported by an angle bracket 60, the stem 62 being retained by a jam nut 63. The angle brackets 60 are in turn bolted to the plates 54. As can be seen from the drawings, by virtue of the symmetrical slots 56 provided in the plates 54, the positions of the rollers 59 may be adjusted with respect to the longitudinal centerline of a strip of molding M as it travels through the machine, thereby to accommodate moldings of various cross-sectional forms.

Figure 10:
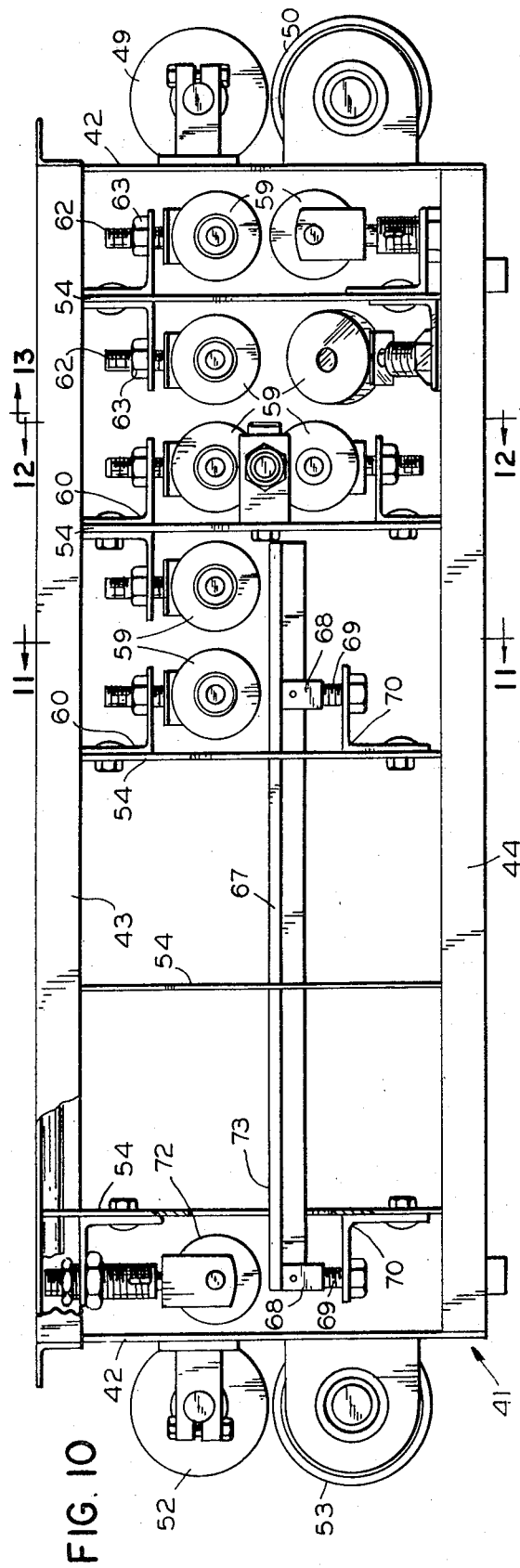
FIG. 10 is a side elevation of the machine of FIG. 9.

As shown in FIGS. 9, 10 and 11, a support bar 67 is adjustably disposed below the path of travel of the molding M. Such support bar 67 is maintained in a rigid position by supporting yokes 68 having stems 69 threadedly received in angle brackets 70 bolted to the lowermost slot 71 of a plate 54. The bar 67 is adapted to engage the underside and prevent downward deflection of a strip of molding as it travels through the machine. A final roller 72 retains the molding in contact with the upper surface 73 of the bar 67 as the molding approaches the rolls 52 and 53 at the out-feeding end of the machine.

The embodiment disclosed in FIGS. 9–13 is suitable for strip moldings or boards of varying widths, and the flexibility provided by the symmetrical slots 56 permits the machine to be adapted to a variety of cross-sectional configurations.

OPERATION

In operation of either of the above described embodiments, a strip molding M, together with a run of initially flat film F (preferably vinyl), is delivered by suitable means (not shown) to the in-feed end of the machine with the film above and converging toward the molding (see FIG. 5); the film—which is initially considerably wider than, but symmetrical to, the molding (see FIG. 6)—having an adhesive pre-applied to its under surface. Also, one or both of the film and molding may, if desired, be preheated.

Upon passage between the in-feeding rolls, the film is engaged with the face of the molding and thence both advance together through the machine. Here, it is to be noted that the film is of a width sufficient to cover both the face of the molding and its side edges, and to thence turn under the molding a short distance, should this be desired.

With the advance of the molding and film through the machine, the rollers of each row of the spring-pressed roller units—starting with the roller nearest the in-feed end of the machine—act in succession (on opposite sides of an intermediate longitudinal line of the film) to impose a pressure on the film toward and to bond it to the molding; such successive action of the rollers being first with laterally outward progression from such intermediate longitudinal line to the related side edge of the molding to bond the film to the face of the molding; to thence fold the film down and—with pressure—bond it to the related side edge of the molding; and finally to turn the film under and—with pressure—bond it to the underside of said molding. This successive action of each of the row of the rollers—resulting from the disposition thereof on a helical curve or other configuration encompassing substantially one-half the molding from the corresponding side thereof—effectively and smoothly bonds the film to the molding.

In the embodiment shown in FIGS. 1-8, it is important to note that when certain of the rollers 20 are exerting a downward pressure on the molding from above, the molding in such area is supported from below and against downward deflection by the rollers 29, and when other of the rollers 20 are exerting an upward pressure on the molding from below, the molding in the latter area is backed from above and against upward deflection by the rollers 32. This function is provided by the support bar 67 and roller 72 in the embodiment of FIGS. 9-13.

Further, to assure against wrinkling of the film as laminated on the molding, the roller units are cocked very slightly in a direction which tends to draw the film laterally taut as the bonding action progresses.

Upon the product (comprised of the molding and surface-textured film bonded thereto) reaching the forward end of the machine, such product is received between the out-feeding rolls and discharged therefrom.

If necessary to maintain the molding against lateral displacement as it travels through the machine (and which may occur due to the cross-sectional configuration of the molding), vertical axis, side-guide rollers 33 may be mounted at opposite ends of the frame in position to engage an edge of such molding.

Because of the box-like and unitary construction of the present machine, it is possible to readily substitute one for another—in the nature of a cartridge—in the overall apparatus in which the machine is employed. Once the machines are adjusted properly, several may be maintained, each being adapted to handle a strip molding of a different cross sectional form.

The term "strip molding" shall be deemed to embrace any elongated strip material of wood or other substance.

From the foregoing description, it will be readily seen that there has been produced such a machine for laminating surface-textured film on strip molding as substantially fulfills the objects of the invention, as set forth herein.

I claim:

1. A machine for laminating film on strip molding, comprising
   a frame, said frame including ends;
   means on said frame to support and advance a strip molding in a predetermined lineal path, a strip molding and a run of film being simultaneously in-fed to said means in face-to-face relation through the machine in said lineal path, there being an adhesive on one of the adjacent faces of the molding and film;
   said film being of a width to cover both the face of said molding and its side edges and thence to turn under said molding;
   frame-mounted pressure means acting on the advancing molding and film to bond said film to said molding, said frame-mounted pressure means comprising a plurality of longitudinal rows of spring-pressed rollers disposed on opposite sides of an intermediate longitudinal line of said molding; and
   means mounting each of said longitudinal rows of rollers so that each such row follows an elongated helical curve extending forwardly from a point on the face side of said molding, thence about the related side edge thereof, and finally terminating on the opposite side of said molding, whereby said rollers of each of said rows act in succession to impose a pressure on said film toward said molding to bond said film thereto, said mounting means for each row of rollers comprising
   an elongated carrier bar extending between and secured to said ends of said frame;
   each of said carrier bars being formed as an elongated part-helix approaching 180 degrees in extent;
   the rollers of each of said rows being attached to and extending from said carrier bar toward the advancing molding and film.

2. A machine for laminating film on strip molding, comprising
   a frame;
   means on said frame to support and advance a strip molding in a predetermined linear path, said strip molding and a run of laminating film being simultaneously in-fed to said supporting and advancing means in face-to-face relation through said machine along said lineal path, there being an adhesive on one of the adjacent faces of said molding and film;
   a plurality of supporting plates mounted along the length of and supported by said frame;
   pressure means adjustably attached to said supporting plates and including a plurality of spring-biased rollers disposed on opposite sides of an intermediate longitudinal line of said molding, said rollers being adapted to impose a pressure on said film toward and to bond said film to the adjacent face of said molding as said film and said molding advance through said machine;
   a plurality of symmetrically disposed slots in each of said supporting plates; and
   bracket means adjustably connectable to said supporting plates through said slots, said rollers being attached to said bracket means, whereby the positions of said rollers may be adjusted with respect to said intermediate longitudinal line of said molding to accommodate moldings of various cross-sectional forms.

References Cited

UNITED STATES PATENTS

| | | | |
|---|---|---|---|
| 3,375,152 | 3/1968 | Lundberg et al. | 156—479 X |
| 3,296,052 | 1/1967 | Bechtold | 156—477 B X |
| 3,475,261 | 10/1969 | Ettore et al. | 156—479 X |
| 3,383,262 | 5/1968 | Ettore et al. | 156—479 X |

RALPH S. KENDALL, Primary Examiner

C. WESTON, Assistant Examiner

U.S. Cl. X.R.

156—475, 477, 480